Figure 1:
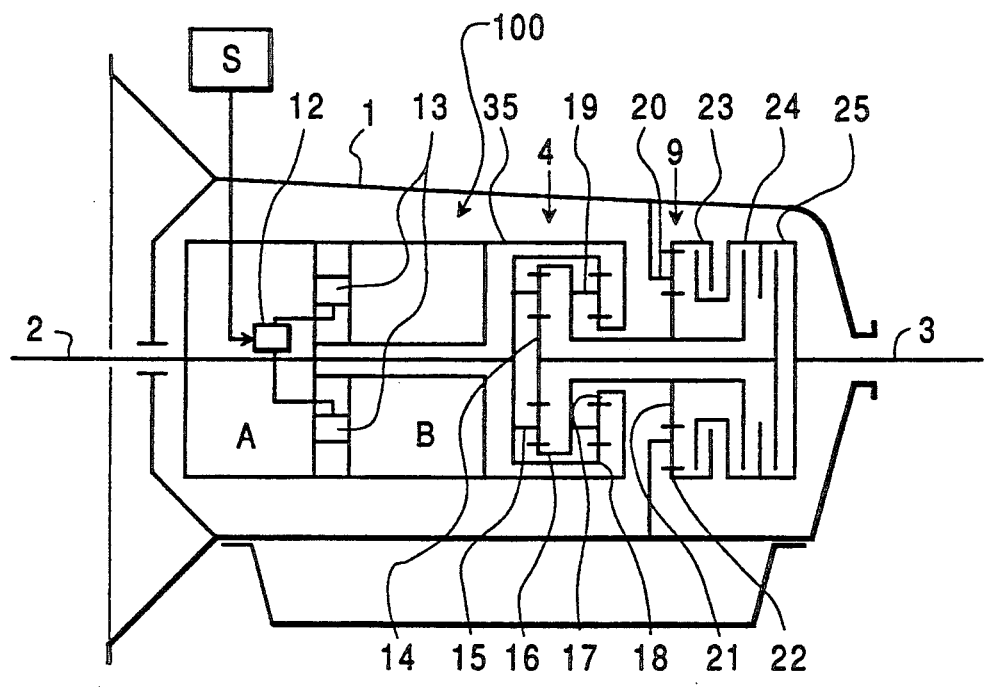

United States Patent [19]

Meyerle

[11] Patent Number: 5,114,385
[45] Date of Patent: May 19, 1992

[54] BRANCHED INFINITELY-VARIABLE HYDROMECHANICAL TRANSMISSION FOR MOTOR VEHICLES

[76] Inventor: Michael Meyerle, Kiefernweg 9, D-7996 Meckenbeuren-Lochbrucke, Fed. Rep. of Germany

[21] Appl. No.: 595,707

[22] PCT Filed: Sep. 16, 1986

[86] PCT No.: PCT/DE86/00367
   § 371 Date: Jul. 16, 1987
   § 102(e) Date: Jul. 16, 1987

[87] PCT Pub. No.: WO87/01781
   PCT Pub. Date: Mar. 26, 1987

Related U.S. Application Data

[63] Continuation of Ser. No. 494,856, Mar. 19, 1990, abandoned, which is a continuation of Ser. No. 300,175, Jan. 17, 1989, abandoned, which is a continuation of Ser. No. 113,187, Jul. 16, 1987, abandoned.

[30] Foreign Application Priority Data

Sep. 18, 1985 [DE] Fed. Rep. of Germany ....... 3533192
Mar. 24, 1986 [DE] Fed. Rep. of Germany ....... 3609907

[51] Int. Cl.$^5$ ............................................. F16H 47/04
[52] U.S. Cl. ............................................. 475/79; 475/81
[58] Field of Search ................... 475/72, 76, 79, 80, 475/81

[56] References Cited

U.S. PATENT DOCUMENTS

| | | | |
|---|---|---|---|
| 3,470,769 | 10/1969 | Livezey | 74/687 |
| 3,714,846 | 2/1973 | Louis et al. | 74/687 |
| 4,184,385 | 1/1980 | Maeda | 74/687 |
| 4,232,568 | 11/1980 | Maeda | 74/687 |
| 4,286,477 | 9/1981 | Meyerle et al. | 74/687 |
| 4,291,592 | 9/1981 | Meyerle et al. | 74/687 |
| 4,304,151 | 12/1981 | Meyerle et al. | 74/687 |
| 4,368,653 | 1/1983 | Mizuno et al. | 74/687 X |
| 4,373,359 | 2/1983 | Ehrlinger et al. | 74/687 |
| 4,382,392 | 5/1983 | Meyerle et al. | 74/687 |
| 4,434,681 | 3/1984 | Friedrich et al. | 74/687 |

FOREIGN PATENT DOCUMENTS

| | | |
|---|---|---|
| 0081696 | 6/1983 | European Pat. Off. . |
| 2541975 | 3/1977 | Fed. Rep. of Germany . |
| 2220027 | 9/1974 | France . |
| 2387388 | 11/1978 | France . |

*Primary Examiner*—Dwight Diehl
*Attorney, Agent, or Firm*—Staas & Halsey

[57] ABSTRACT

A branched, infinitely variable hydromechanical transmission with multiple power-transmission paths for motor vehicles has an expanded first shift range to facilitate broadening of the overall gear-shift range to achieve higher power density and eliminates the need for a starting clutch. The transmission includes a first hydrostatic unit with an adjustable volume, a second hydrostatic unit, preferably with a constant volume, and one or more summation gear trains for adding together the power transmitted from the transmission input along hydraulic and mechanical power-transmission paths. The input shaft of the transmission is connected directly to the drive motor.

11 Claims, 3 Drawing Sheets

BRANCHED INFINITELY-VARIABLE HYDROMECHANICAL TRANSMISSION FOR MOTOR VEHICLES

This is a continuation of copending application Ser. No. 07/494,856 filed on Mar. 14, 1990, which is a continuation of Ser. No. 07/300,175 filed Jan. 17, 1989, which is a continuation of Ser. No. 07/113,187 filed Jul. 16, 1987 now all abandoned.

The present invention relates to infinitely variable hydromechanical transmission with multiple power-transmission paths and having a first hydrostatic unit with an adjustable volume and a second hydrostatic unit, preferably with a constant volume, and one or more summation gear trains for adding together the power which originally is separated at the transmission input for transmission hydraulic and along separate mechanical power-transmission paths.

German Patent Specification 31 47 447 discloses a hydromechanical transmission with multiple power-transmission paths and having a plurality of gear-shift ranges which, similarly to the transmission of the invention, has a first hydrostatic unit with an adjustable volume and a second hydrostatic unit with a constant volume in this known transmission, during start-up and with the first driving range clutch closed, the first adjustable hydrostatic unit is adjusted to its maximum operating volume and the summation planetary gear train is so designed that in this operating state the transmission power output shaft is driven at a predetermined output speed, which corresponds to the design minimum speed of the vehicle. However, this known transmission does not include either a bypass valve the high-pressure and low-pressure lines of the hydrostatic circuit to facilitate starting or a first driving range clutch which is arranged for used also as a starting clutch. This known transmission includes a separate contrifugal starting clutch which is connected between the drive motor and the input shaft of the transmission. Such starting mechanism is very expensive and it is well known that centrifugal are not capable of gradual shock free engagement as is ordinarily required in passenger cars.

The object of the present invention is therefore to provide a hydromechanical transmission with multiple power-transmission paths which, in order to broaden the gear-shift range and/or to increase the power density, has an expanded first driving range and does not require a separate starting clutch.

Compared to the prior art transmissions of this type which includes an additional starting clutch, the invention has the advantage that it is simpler and less expensive and conserves the space which would otherwise be required for the starting clutch. Moreover, in accordance with the present invention the input shaft of the transmission maybe connected directly to the drive motor.

Figure 2:
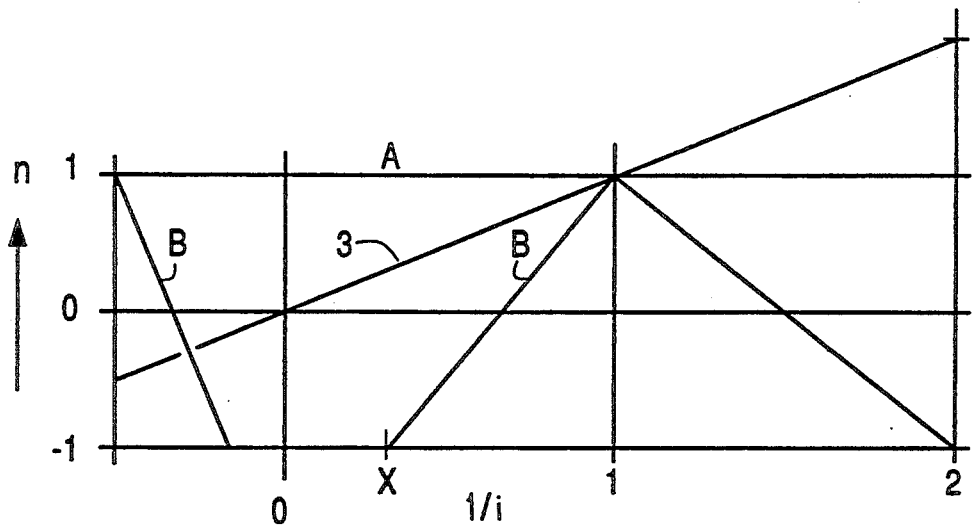
Figure 3:
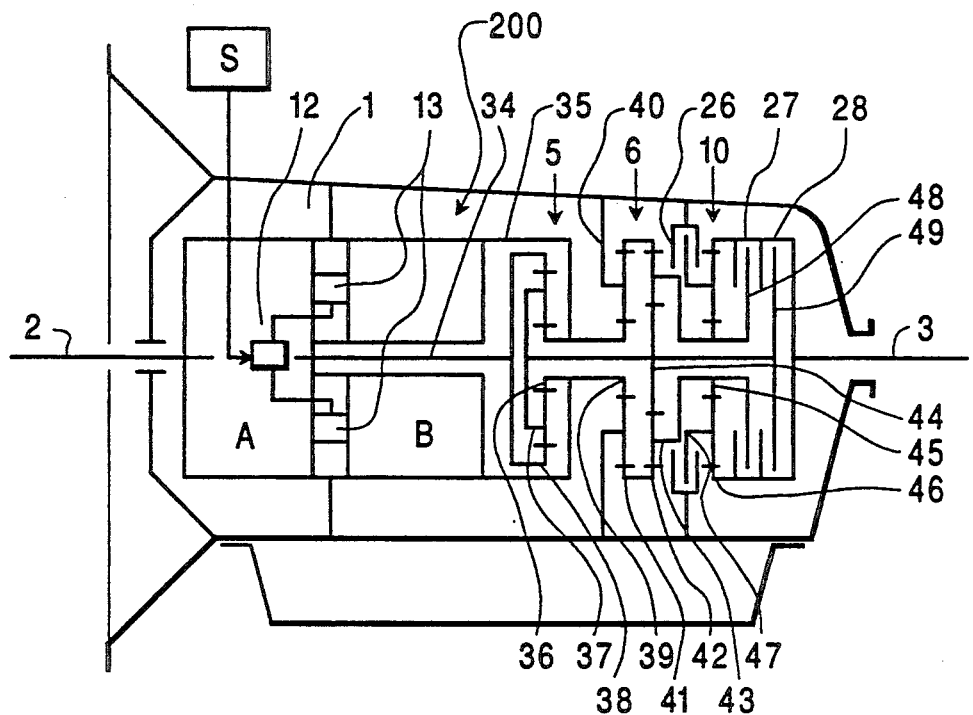
Figure 4:
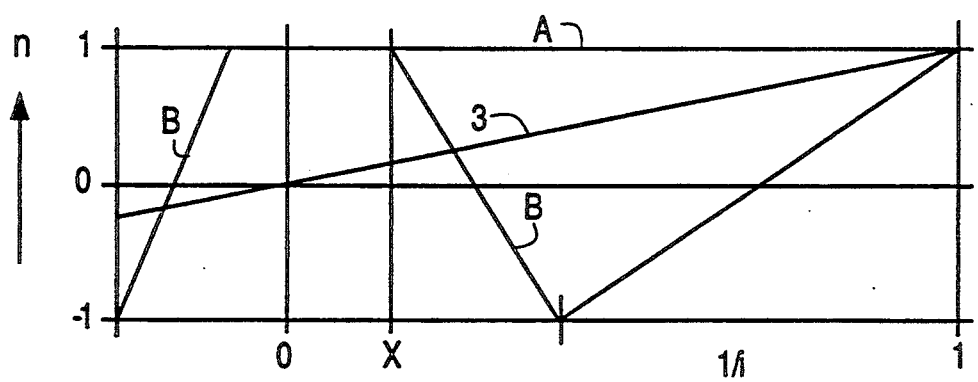
Figure 5:
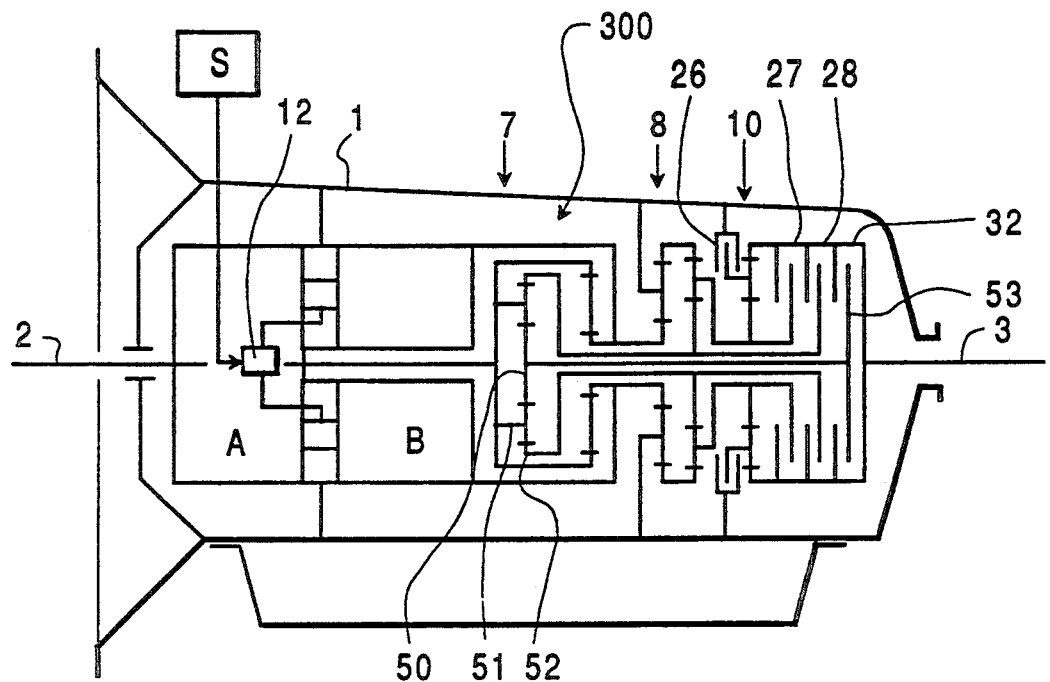
Figure 6:
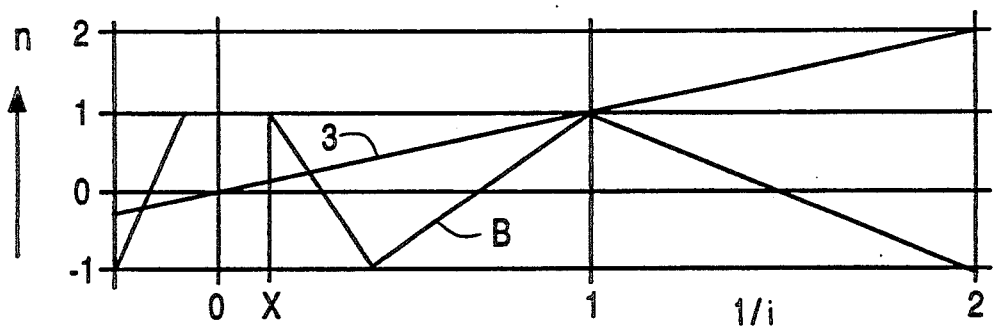

Certain preferred specific embodiments of the invention will now be discussed hereinbelow with reference to the drawings, in which:

FIG. 1 is a schematic illustration of a hydromechanical transmission that has multiple power-transmission paths and two hydro-mechanical forward driving paths, the first range being expanded by the transmission-ratio dimension X, and the reverse range being similarly expanded, FIG. 2 is a speed diagram for the specific embodiment of FIG. 1, FIG. 3 is a schematic illustration of a transmission design that has two forward driving ranges and one reverse range, the first forward driving range and the reverse range being expanded in the same way as in the embodiment of FIG. 1, FIG. 4 is a speed diagram for the specific embodiment shown in FIG. 3, FIG. 5 is a schematic illustration of a transmission design that has three forward ranges and one reverse range, the first forward range and the reverse range being expanded and, FIG. 6 is a speed diagram for the specific embodiment depicted in FIG. 5.

A hydromechanical transmission system 100 with multiple power-transmission paths which embodies the concepts and principles of the invention is illustrated in FIG. 1. Transmission system 100 includes a first hydrostatic unit A with an adjustable volume and a second hydrostatic unit B which preferably has a constant volume. Transmission system 100 also includes a four-shaft summation planetary gear train 4 and a three-shaft planetary gear train 9 that is collocated therewith and preferably includes a planet gear on a carrier 20, a sun gear 21 and an internal gear 22. Transmission 100 also has three range namely clutches, clutch 24 for the first forward driving range, clutch 25 for the second forward driving range and clutch 23 for the reverse range. The summation gear train 4 comprises two individual planetary gear stages, each with one sun gear (14, 17), one planet gear carrier (15, 19), and one internal gear (16, 18).

The first shaft of summation gear train 4 is connected to the planet carrier 15 of the first planetary gear stage and to the internal gear 18 of the second planetary gear step stage and has a direct connection to the input shaft 2 which also provides input power directly to the first hydrostatic unit A. The second shaft of summation gear train is connected directly to the internal gear 16 of the first planetary stage, to the planet carrier 19 of the second planetary stage, to the sun gear 21 of planetary gear train 9 and to a coupling element of the first driving range clutch 24. The third shaft 35 of gear train 4 is connected directly to the internal gear 17 of the second planetary stage. The fourth shaft of summation gear train 4 forms a sun gear 14 of the first planetary stage and is directly connected to a coupling element of the second driving range clutch 25. In this specific embodiment, the two hydrostatic units A and B may be compactly combined to present a single transmission unit and/or a single constructional unit. Likewise, the summation planetary gear train 4, the second planetary gear train 9 and the set of clutches 23, 24, 25 may be arranged in separate modular form. As shown, the separate modular constructional units may be mounted coaxially, as well as staggered parallel, relative to one another, depending on the vehicle requirements. The individual shafts may be connected to each other in the staggered method of construction via suitable ratio steps without changing basic the principles of the system. The staggered arrangement is of particular advantage in transmissions for vehicles with an engine that is installed perpendicularly, e.g., in passenger cars as well as in transmissions for heavy vehicles, buses, commercial vehicles, and absorbing machines.

The operation of the transmission is as follows.

As mentioned above, the summation gear train 4 is so designed that during start-up the second hydrostatic unit B is driven via the third shaft which carries the sun gear 17 of the summation gear train, when the first range clutch 24 is closed. The unit B is driven at a speed substantially higher than that of the first hydrostatic unit A when the operating volume of the latter is set at its maximum valve. Under these operating conditions, the second hydrostatic unit B operates as a pump. According to the invention, the increased delivery of the second hydrostatic unit B occurring during these operating conditions, which cannot be accommodated by the first hydrostatic unit A, is equalized by opening of the bypass value 12 connected between the two high-pressure and low-pressure lines 13 of the hydrostatic circuit.

During start-up, the bypass valve 12 is gradually closed by a signal S, so that inevitably both hydrostatic units A and B, in accordance with their volumes, which, under these conditions are at their maximum valves, are forced to reach the same speed which corresponds to a minimum travelling speed corresponding to the transmission-ratio point X (FIG. 2). This starting process corresponds to the closing process of a starting clutch of a conventional transmission or to the starting process of the prior art hydromechanical transmission system referred to above. In order to obtain a gradual start-up without shock, the bypass valve 12 is controlled by a signal S from the braking system, e.g. by release of the brake pedal, and/or by the engine speed and/or by a load-dependent signal, e.g., the operating pressures within the hydrostatic transmission A, B.

The starting mechanism of the transmission 200 depicted in FIG. 3 is identical to that of transmission 100 of FIG. 1. However, transmission 200 is distinguished by a different transmission system with multiple power-transmission paths, which is based on the provision of two summation planetary gear trains 5 and 6. The first summation planetary gear train 5 comprises a three-shaft planetary gear train which includes a sun gear 36, a planet carrier 37 for a planet gear and an internal gear 38. The second summation planetary gear train 6 is constructed with two planetary gear train stages. In this arrangement, sun gear 39 of one stage is constantly connected to sun gear 36 of gear train 5 and sun gear 44 of the other stage is constantly connected to planet carrier 37 of gear train 5. An output shaft planet gear carrier 43 of the second summation planetary gear train 6 is connected to another planetary gear train 10 and to a coupling element 48 of the first range clutch 27. A coupling element 49 of the second range clutch 28 is connected to a sun gear 44 of the second summation planetary gear train 6 and to a planet carrier 37 of the first summation planetary gear train 5.

Compared to the transmission 100 of FIG. 1, the two hydrostatic units A and B of the transmission 100 FIG. 1 have the same sense of rotation in the starting range, as is apparent from the speed diagram of FIG. 4. The bridging of the expanded speed range or transmission-ratio range to the transmission-ratio point X or of the starting process in this expanded speed range corresponds to the bridging accomplished by the transmission 100 shown in FIG. 1. The mechanical power is transmitted from the input shaft 2 via the inlet shaft 34 of the first hydrostatic unit A and to the first shaft of the summation gear train which comprises the internal gear 38 of planetary gear train 5. Hydrostatic power is transmitted via the shaft 35 to the sun gear 36 of the first summation planetary gear train 5. In the first operating range, the hydrostatic power simultaneously divides into the first summation planetary gear train 5 via sun gear 36 and into the second summation planetary gear train 6 via the sun gear 39. A portion of the hydrostatic power is then summated via internal gears 41 and 42 with the summed power at sun gear 44 derived from the first summation planetary gear train 5 and transmitted to the plate 43 of the second summation planetary gear train 6. In the first gear-shift range, the power is transmitted via clutch element 48 to the output shaft 3. In the reverse range, clutch or brake 26 is closed and the power is transmitted, via the last planetary gear train stage 10 to the sun gear 45, the planet gears on carrier 47 and the internal gear 46 to the output shaft 3.

In terms of operation and design, the FIG. 5 is substantially the same as the transmission 200 of FIG. 3. Transmission 300 is distinguished by the presence of an additional third gear-shift area, so that the power volume or the torque-changing range of the transmission, without changing the size of the hydrostatic transmission, is almost doubled. The third range is realized by designing the first summation planetary gear train 7 as a four-shaft planetary gear train, preferably with an additional planetary gear train step comprising sun gear 50, planet carrier 51 and internal gear 52, and by connecting the fourth shaft, which comprises the sun gear 50, to an element 53 of the third range clutch 32. The speed curve of the hydrostatic units A and B, as well as of the output shaft 3, is shown in FIG. 6.

As a result of the expansion of the first range of in this way, there is obtained, aside from a substantial increase in the marginal power of the transmission, and without increasing the installation space, starting characteristics that are gradual and without shock to satisfy the driver's desires.

In these types of transmissions, the appropriate control signals are available anyhow, so the costs for the starting mechanisms are relatively low.

In a specific embodiment not shown in the drawings, the by-pass valve 12 is replaced by a pressure actuated valve. Here, one of the clutches 23, 24, 26 or 27 may be additionally used as a starting clutch. This means that the transmission-ratio range up to the transmission-ratio point X must be bridged by the corresponding clutch by applying to this clutch—as is customary with starting clutches—an appropriately metered, continuous pressure. The signals required for the continuous pressure buildup of the starting clutch are identical to the signals mentioned above.

In order to close the clutch used as the starting clutch, a continuous clutch pressure is produced to ensure a gradual start without shock. This pressure is monitored by a controllable pressure valve, which is controlled by an appropriate signal. In the specific embodiment, this signal is a signal which is dependent on brake actuation and/or engine-speed and/or load.

SEQUENCE OF OPERATIONS

By applying the brake, the direction of travel is preselected, as is customary in vehicles with automatic transmissions. Upon release of the brake, the controllable pressure valve is already triggered by a signal which is dependent on the braking system in order to produce a clutch pressure so high that a minimum force arises at the wheels of the vehicle without pushing the engine below a minimum idling speed. Depending on the requirements, one can, by means of an additional signal, e.g., from the engine speed, influence the pressure control valve further by an additional signal, e.g., from the engine speed, in order to further increase the clutch pressure or to adapt same to the prevailing conditions. For example, it is possible, by means of an automatic control device, to exert an automatic influence on the engine control, so that the engine cannot be stalled without stepping on the gas pedal. The clutch pressure can also be controlled, solely or additionally, by a load-dependent signal, e.g. via the high pressure of the hydrostatic unit.

By means of this device it is possible, in accordance with vehicle-specific conditions, to create a smooth, sensitive and vehicle-oriented starting gear, which, when compared to prior art devices, offers great advantages in terms of cost and installation space.

I claim:

1. A multiple path, infinitely variable hydromechanical transmission comprising:
   a rotatable power input shaft;
   a first adjustable volume hydrostatic unit that is coupled to said power input shaft for receiving input power therefrom;
   a second hydrostatic unit having a hydrostatic power outlet shaft, said first and second hydrostatic units being operably hydraulically coupled by high and low pressure lines;
   a multiple shaft summation gear train having a first shaft coupled to said power input shaft, a second shaft coupled to said hydrostatic power outlet shaft, and a third shaft that may be coupled to a load, said gear train being arranged such that said second shaft is rotated by the gear train at a higher rotational speed than said power input shaft to thereby drive the second hydrostatic unit at a higher speed than the first hydrostatic unit when the third shaft is coupled to a load at zero speed in a starting range; and
   a bypass valve operably connected between said high and low pressure lines for relieving pressure developed as a result of said second hydrostatic unit being driven by the gear train at a higher speed than the first hydrostatic unit.

2. A transmission as set forth in claim 1, wherein said summation gear train includes a four-shaft planetary gear train and a three-shaft planetary gear train collocated to the four-shaft planetary gear train, said three-shaft planetary gear train having a sun gear and an internal gear, said transmission further including a clutch for coupling said hollow gear to said load, said gear trains being arranged so that the hydrostatic units rotate in opposite directions when the transmission is in said starting range.

3. A transmission as set forth in claim 1, wherein said summation gear train includes at least two summation planetary gear trains and a third gear train having an output shaft, said transmission including a clutch for coupling said output shaft to a load and at least two driving range clutches, said gear trains being arranged so that the hydrostatic units rotate in the same direction when the transmission is in said starting range.

4. A transmission as set forth in claim 1, wherein said summation gear train includes a first four-shaft summation planetary gear train that is collocated to said hydrostatic units and a second summation planetary gear train, said transmission including at least three driving range clutches, a third three-shaft planetary gear train and a reverse range clutch for drivingly coupling said third planetary gear train into the power transmission paths, said gear trains being arranged so that the hydrostatic units rotate in the same direction when the transmission is in said starting range.

5. A transmission as set forth in claim 4, wherein said summation gear train includes a first four-shaft summation planetary gear train that is collocated to said hydrostatic units and a second summation planetary gear train, said transmission including at least three driving range clutches, a third three-shaft planetary gear train and a reverse range clutch for drivingly coupling said third planetary gear train into the power transmission paths, said gear trains being arranged so that the hydrostatic units rotate in the same direction when the transmission is in said starting range.

6. A multiple path, infinitely variable hydromechanical transmission comprising:
   a rotatable power input shaft;
   a first adjustable volume hydrostatic unit that is coupled to said power input shaft for receiving input power therefrom;
   a second hydrostatic unit having a hydrostatic power outlet shaft;
   a multiple shaft summation gear train having a first shaft coupled to said power input shaft, a second shaft coupled to said hydrostatic power outlet shaft, and a third shaft that may be coupled to a load, said gear train being arranged such that said third shaft is rotated by the gear train at a rotational speed which corresponds to a transmission ratio point (x) when the third shaft is not coupled to a load at zero speed in a starting range; and
   a friction clutch for selectively coupling the third shaft to said load, and which serves both as a start up clutch and as a driving range clutch.

7. A transmission as set forth in claim 6, wherein said summation gear train includes a four-shaft planetary gear train and a three shaft planetary gear train collocated to the four-shaft planetary gear train, said three-shaft planetary gear train having a sun gear and an internal gear, said internal gear being connected to the third shaft of the multiple shaft summation gear train, said gear trains being arranged so that the hydrostatic units rotate in opposite directions when the transmission is in said starting range.

8. A transmission as set forth in claim 6, wherein said summation gear train includes at least two summation planetary gear trains and a third gear train having an output shaft, said output shaft being connected to said third shaft of the multiple shaft summation gear train, said transmission including at least two additional driving range clutches, said gear trains being arranged so that the hydrostatic units rotate in the same direction when the transmission is in said starting range.

9. A transmission as set forth in claim 6, wherein said clutch is controlled by a signal.

10. A transmission as set forth in claim 9, wherein said signal is a brake signal, an engine RPM signal or a load-dependent signal.

11. A transmission as set forth in claim 10, wherein said signal is generated by releasing a brake pedal.

* * * * *